United States Patent
East et al.

(10) Patent No.: US 7,836,264 B2
(45) Date of Patent: Nov. 16, 2010

(54) METHOD OF REPLICATING DATA BETWEEN COMPUTING DEVICES WHICH EACH USE LOCAL CLOCKS

(75) Inventors: Simon Jeremy East, London (GB); Stephen Timothy Spence, Kingston Upon Thames (GB); Thomas Ralph Edwards Greenwell, Herts (GB)

(73) Assignee: Critical Path Data Centre Limited, Cheshire (GB)

( * ) Notice: Subject to any disclaimer, the term of this patent is extended or adjusted under 35 U.S.C. 154(b) by 0 days.

(21) Appl. No.: 10/496,557

(22) PCT Filed: Nov. 26, 2002

(86) PCT No.: PCT/GB02/05311

§ 371 (c)(1),
(2), (4) Date: May 25, 2004

(87) PCT Pub. No.: WO03/046723

PCT Pub. Date: Jun. 5, 2003

(65) Prior Publication Data

US 2005/0108289 A1    May 19, 2005

(30) Foreign Application Priority Data

Nov. 26, 2001    (GB) ................... 0128243.3

(51) Int. Cl.
*G06F 12/12*    (2006.01)
(52) U.S. Cl. ................. 711/161; 711/167; 711/E12.069
(58) Field of Classification Search .................. 711/161
See application file for complete search history.

(56) References Cited

U.S. PATENT DOCUMENTS

| | | | | |
|---|---|---|---|---|
| 4,142,069 A * | 2/1979 | Stover | ......................... | 370/507 |
| 5,921,938 A * | 7/1999 | Aoyama et al. | ............. | 600/509 |
| 5,924,094 A * | 7/1999 | Sutter | ........................... | 707/10 |
| 5,966,387 A * | 10/1999 | Cloutier | ...................... | 370/516 |
| 6,167,276 A * | 12/2000 | Pite | ......................... | 455/456.3 |
| 6,446,092 B1 * | 9/2002 | Sutter | ......................... | 707/203 |
| 6,477,617 B1 * | 11/2002 | Golding | ...................... | 711/112 |
| 6,535,926 B1 * | 3/2003 | Esker | ......................... | 709/248 |
| 6,587,875 B1 * | 7/2003 | Ogus | ......................... | 709/223 |
| 6,636,851 B1 * | 10/2003 | Bamford et al. | ................. | 707/8 |
| 6,802,019 B1 * | 10/2004 | Lauder | ....................... | 713/400 |
| 6,975,618 B1 * | 12/2005 | Smith et al. | ................. | 370/350 |
| 7,602,744 B2 * | 10/2009 | Kaikuranta et al. | ......... | 370/328 |
| 2003/0140050 A1 * | 7/2003 | Li et al. | ...................... | 707/100 |
| 2003/0144006 A1 * | 7/2003 | Johansson et al. | ........... | 455/456 |
| 2003/0189953 A1 * | 10/2003 | Matsumura et al. | ......... | 370/503 |
| 2004/0072595 A1 * | 4/2004 | Anson et al. | ................. | 455/566 |

OTHER PUBLICATIONS

PCT International Preliminary Examination Report; dated Aug. 27, 2004—4 pages.
PCT International Search Report—4 pages.
Response to Written Opinion—dated May 19, 2004—4 pages.

* cited by examiner

*Primary Examiner*—Shane M Thomas
*Assistant Examiner*—Ryan Dare
(74) *Attorney, Agent, or Firm*—Saul Ewing LLP

(57) ABSTRACT

Where a first computing device is given responsibility for determining whether data that is time stamped by a second computing device is replicated or not, then the first device can compare a time stamp from the second device against a time signal from its own internal clock to determine a delta and use that delta to deduce the correct delta to apply to time stamps associated with later data from the second computing device.

19 Claims, No Drawings

METHOD OF REPLICATING DATA BETWEEN COMPUTING DEVICES WHICH EACH USE LOCAL CLOCKS

CROSS REFERENCE TO RELATED APPLICATIONS

This application claims the priority of PCT Application No. PCT/GB02/05311 filed on Nov. 26, 2002, and British Application GB 0128243.3 filed on Nov. 26, 2001, the contents of which are hereby incorporated by reference.

FIELD OF THE INVENTION

This invention relates to a method of replicating data between computing devices which each use local clocks.

DESCRIPTION OF THE PRIOR ART

Data replication between computing devices occurs in many different contexts, such as synchronising documents, e-mails, contacts and calendar entries across different computing devices used by the same person. In order for data replication to be accurate, there must be some system for deciding which of two or more inconsistent data replication requests should be acted on. Take for example the situation where, at time 1, a user enters a change to his e-mail details for person X on his mobile telephone. Some time later, at time 2, the user realises that those changes were in fact wrong. He makes a further change to those person X email detail, but does so on a PC. At time 3, he synchronises his PC to a master server, updating the master record of person X's e-mail to the correct address. But suppose later still, at time 4, he synchronises his mobile telephone with the master server—this would potentially over-write the correct person X email details (entered at time 2) with the incorrect details entered originally at time 1.

To address this problem, synchronisation systems typically employ time based arbitration rules, such as giving priority to the latest recorded change (time 2 as compared to time 1 in the example above). This requires a device to be able to associate a time stamp with data to indicate when that data was changed on the device; this is commonly done for wire-line based devices (as opposed to devices communicating over a wireless network) by providing a database on a computing device which stores data of a given type (e.g. a database for all contacts details for an individual—name, e-mail, telephone, mobile etc; these form a single contact record. There would typically be another database for e-mail, another for calendar entries etc.). Whenever anything in a given record is changed (e.g. a new e-mail address for an individual), then the device logs that change as part of the record and time stamps it (again, as an entry forming part of the record) with the time established by a quartz clock running locally on the device. Changes to data (e.g. the new e-mail contact details for the individual) are then sent to a central server; an entire replacement record is usually sent (e.g. all existing contact details for the individual, plus the new e-mail address, plus the time stamp)—the central server then updates its master copy of the information and sends updating information to any devices so that all maintain the same information. The central server typically applies arbitration rules using the time stamp to resolve conflicts between competing and inconsistent synchronisation requests.

Conventional data replication systems are therefore reliant on time stamps applied to database records. The time stamps are made by a local clock running on the device into which the changed data was first input This device could be a client device, server or peer. When there are several devices (each with a local clock) which can accept changes to the same data, then a single device is nominated to apply time based arbitration rules using the time stamped database records. A problem is that those local clocks applying the time stamps will rarely be synchronised to each other. This can happen because (a) quartz clock times drift, (b) users can deliberately input small time adjustments (e.g. so that the device clock runs 5 minutes fast) and (c) users can input deliberate time adjustment of ±n hours (e.g. moving time zone/daylight saving). This can lead to competing and inconsistent synchronisation requests that cannot be correctly handled by the normal arbitration rules.

One approach to solving this is to require that all devices regularly connect to an external and accurate clock—e.g. a web based clock giving GMT (or applicable local time) and re-set their clocks using this. Many users are however reluctant to do this; further, there is no guarantee that all devices providing, to a central arbitrator, data to be replicated will in fact be mutually time synchronised.

SUMMARY OF THE PRESENT INVENTION

In accordance with a first aspect of the present invention, there is a method of replicating data between computing devices which each use local clocks, in which a first computing device is given responsibility for determining whether data that is time stamped by a second computing device, using a clock running on the second device, is replicated or not;

wherein that first device can compare the time stamp from the second device against a time signal from its own local clock to determine a delta and use that delta to deduce the correct delta to apply to time stamps associated to later data from the second computing device.

In this way, the first computing device uses its knowledge of the correct deltas relative to its own internal clock in order to apply correctly a time dependent arbitration rule to determine which of several inconsistent data replication requests (e.g. from several second devices; from the first computing device and a second device etc.) it should action. Local clock drift can be fully compensated for.

This approach useful when the time stamps applied to the later data by the second device are not received immediately when generated but significantly later, so that the first computing device cannot directly compare the time stamps against signals from its own clock. This will often arise in practice, especially where the second computing devices are portable, wireless devices (e.g. mobile telephones) and they batch up all data to be replicated for efficient use of bandwidth, to use lower cost night time tariffs or are simply out of coverage when the changes are first input.

In one implementation, the internal clock of the first computing device is set to an absolute, externally derived time, such as GMT. Other optional features are that the delta deduced by the first device assumes that the local clock in the second device is drifting in a predictable manner, such as a linear manner.

Further, if a deliberate time adjustment to accommodate a change of time frame (e.g. new time zone/daylight saving) is made to the local clock on the second device, then the second device can store a record of this time adjustment and provide it to the first computing device. The first computing device can then compensate for deliberate time adjustments and correctly relate time stamps sent to it from the second computing device to its own internal clock, and hence apply time based arbitration rules consistently for all devices connecting to it and supplying time stamped data replication requests.

The second device can also alter one or more time stamps stored on it by the amount of the deliberate time adjustment so that the time stamps remain correct in the new time frame.

In a second aspect, there is a computing device capable of replicating data and having responsibility for determining whether data that is time stamped by a second computing device is replicated or not;

wherein the device can compare the time specified by a local clock on the second device against its own local clock to determine a delta and use that delta to deduce the correct delta to apply to time stamps for later data from the second computing device.

Section 6.2 of the following Detailed Description describes an implementation in more detail.

DETAILED DESCRIPTION

The present invention will be described with reference to an implementation from Cognima Limited of London, United Kingdom. Cognima has developed a data replication technology that directly addresses the need for Mobile Service Providers (MSPs) and Network Operators to increase consumer adoption of data services, encourage greater loyalty from their valuable customers, and differentiate their services from the competition.

Cognima's data replication solution addresses these issues by:

Increasing adoption by making data services compelling and effortless to use.

Establishing a high barrier to churn by securely backing up subscribers' personal data on servers controlled by those subscribers' MSP.

Enabling the MSP to create differentiated services by controlling the customer experience.

1. Overview of Uses for the Cognima Data Replication Framework

Cognima's data replication framework enables a Mobile Service Provider to build compelling services for consumer markets. The MSP hosts a Cognima Server at its data centre. The server comprises an Oracle database plus Cognima's multi-threaded Java communications server, hosted on a standards-based J2EE application server and carrier-grade Unix hardware. Section 4 and later sections describe the technical implementation in detail.

The Cognima framework replicates data entered in a mobile phone automatically (without any user intervention) to other phones via the Cognima Server. Similarly, data from external systems connected to the Cognima Server is automatically kept up-to-date on mobile phones.

Mobile subscribers using Cognima-enabled applications experience an always-available, instant connection to their personal information and friends.

Personal information can include the subscriber's address book, messages, bank account details, stock prices, pizza orders, calendar, current traffic on a route to work, or any other personalised content. The data is always kept securely backed-up on the Cognima Server and automatically replicated on all relevant client devices.

Always-available means that the personal information is accessible on whichever device or handset the subscriber is carrying, whether currently connected to the network or not since the user can always access personal information stored locally on the device). Users can also edit and manage their personal data directly on the server via a web interface—the Virtual Phone.

Instant means that subscribers do not have to wait for data to download from a server; the latest information is on their handsets even before they know they need it since that data is automatically sent to the handset (e.g. polling by the handset may occur; this can be regular periodic—such as every 30 minutes or at pre-defined times (4 pm, 5 pm etc). Pushing to the handset may also occur).

Subscribers can share their data across multiple devices and with their friends since the Cognima Server can replicate this data to any defined device or defined individual.

1.1 Example Cognima Applications

| Customer | Need | Cognima Application |
|---|---|---|
| Sarah | Sarah's phone has been stolen, including some important contact numbers and messages for which she has made no manual back-up copy. | Whenever Sarah enters data in her phone, Cognima automatically backs it up on a central server at the MSP's data centre. Sarah can buy a new mobile phone, and retrieve all her contacts and messages instantly from the central server, as long as she remains with the same MSP. She can also delete her data from the stolen phone via the MSP's portal. |
| Jill | Jill is out shopping. Before making an expensive purchase, she needs to know if her salary has been paid into her bank account. However, she is in the basement of a department store, and has no network coverage. | Cognima keeps Jill's personalised content (including her bank account details) up-to-date automatically on her mobile phone by periodically (or at a predefined time or even immediately a change occurs) sending any changed data to Jill's mobile. The latest data is there on Jill's phone even before she knows she needs it. She can access it instantly, even if there is no network coverage. |
| Matthew | Matthew likes to keep his friends informed about his current availability and 'mood'. He also likes to see what his friends are up to. He's mainly interested in keeping track of what's happening in his social group, and he wants to do this at a glance, without having to go 'on-line' or send lots of expensive messages. | Cognima shares Matthew's presence profile with his friends. When he changes his profile (e.g. selects an icon to indicate he's feeling sociable) the icon updates automatically in Matthew's address book entry on his friends' phones. Matthew can see presence information for all his friends at a glance on his own phone. He can even ask his phone to alert him when a friend is feeling sociable or bored, so that he can immediately call. |
| Laura | Laura has two mobile phones - one she uses at work, and a fashion-phone she takes out in the evenings. She wants to keep the same address book on both devices, but she hates entering data twice, and she's never figured out how to use the sync software that came with her phone. Swapping the SIM card over is cumbersome, and leaves behind data in the phone memory. | Cognima automatically keeps all the data in Laura's phones in step. Whenever she edits data on one handset, it is immediately (or periodically or at a predefined time) replicated onto the Cognima server which then updates her other phone as well. She never has to remember to press a 'sync button' - it just happens. Jill even shares some of the contacts in her phone with her husband, Geoff. When Geoff enters his mother's new mobile number, it is automatically updated in Jill's phones as well. |

-continued

| Customer | Need | Cognima Application |
|---|---|---|
| Juha | Juha also has two mobile devices - a phone and a wireless-enabled PDA. He needs to read and reply to e-mail and SMS messages on both devices, but he gets confused and frustrated, and loses productivity, when his Inbox gets out of sync. | With Cognima, SMS, e-mail and other types of messages can be read and sent from any device, and also using a 'Virtual Phone' web interface. Messages are received on all devices used by the subscriber, and sent messages appear in the Outbox on all devices. Any message read on one device is instantly marked as read on all other devices. Messages deleted from a mobile phone can be stored and retrieved via the Cognima Server. |

2. Benefits to the Mobile Subscriber

Cognima provides an ideal framework for implementing mass-market consumer data services based on the following key benefits:

Friendliness: no user intervention is required. Subscribers never need to press a 'sync' or 'download' button to access their data. System configuration and secure data transfer are completely transparent to the end user.

Instant availability: the user is always able to interact instantly with local data (even when off-line), whilst any updates take place silently in the background. For example, users can read their personalised content whilst on an underground train. The user experience is separated from the data transport.

Affordability: The MSP can control when replication takes place, and the Quality of Service (QoS) delivered. However, because the user experience is separated from the data transport, lower QoS does not affect the user's perception of the service. Crucially, this allows the MSP to offer low-cost, subscription-based services with relatively poor QoS without sacrificing user experience—e.g. data replication can happen overnight for non-urgent data services such as bank statements, yet still be satisfactory to users. Overnight data replication uses otherwise underused bandwidth and is hence far cheaper than peak time data replication. Urgent data replication (e.g. presence information) can happen at any time on a periodic or (optionally) continuous (push) basis and attract a higher charging rate. Furthermore, efficient use of phone memory & processor power allows Cognima client software to be cost-effectively installed in even the cheapest mass-market phones.

3. Benefits to the Mobile Service Provider

Cognima presents a MSP with a means to generate new data revenues, reduce churn, and to differentiate its services from those of its competitors.

3.1 Increased Usage of Existing Mobile Services

Cognima increases usage of existing mobile services:

Messaging and content-based services become much more convenient and immediate, and will therefore be used more.

The enhanced immediacy of presence information increases the use of chat and Instant Messaging, and an alert when free capability will boost voice calls.

Effortless management of multiple devices allows users to carry an appropriate phone on any occasion, and therefore make more calls and send more messages.

3.2 Compelling New Services

Cognima enables rapid introduction of compelling and affordable new mobile data services.

Cognima delivers a compelling user experience for new services in low-end phones using only spare network capacity. This is affordable and scalable for the network operator, allowing the MSP to offer understandable and predictable pricing for mass-market subscribers.

Most of the application development for new Cognima services takes place on the server side, allowing the MSP to bring new services to market quickly.

Cognima's client software can be installed as a flash memory upgrade, endowing today's mass-market handsets with smart-phone-like capabilities. New software applications can be downloaded over the air to existing Cognima-enabled handsets, allowing MSPs to roll out new data services without waiting for new devices to support them.

Third party application developers can leverage the MSP's Cognima infrastructure to develop new applications for the MSP's network.

3.3 Churn Reduction

Cognima services act as a significant barrier to churn. For example, a subscriber who stores their personal information securely at their MSP's Cognima Server can buy a new phone and immediately retrieve all personal information to their new device. All this personal information may be lost if they decide to take out a subscription with a different service provider.

3.4 Differentiation

Today, subscribers have the same basic experience of using mobile data services on all networks. For example, the experience of using WAP services is defined by the WAP protocols, the browser in the phone, and the content accessed. Many MSPs have realised that they must differentiate themselves by giving their subscribers a unique user experience, but are hindered from doing so by severe constraints to customising the services in mobile handsets.

Cognima gives MSPs the ability to implement services on the handset, and thereby to regain control of their subscribers' user experience. Most importantly, Cognima allows this without sacrificing interoperability; support for industry standards is achieved through straightforward integration with the Cognima Server. The net result is that the MSP's position in the value chain is strengthened versus the powerful brands of handset manufacturers and content providers.

4. Cognima Data Replication Framework Functional Design

4.1 Introduction

This and subsequent sections of the Detailed Description are intended to describe how the Cognima data replication system actually works. It covers the behaviour of client devices, the Cognima Server and the web client, without going into details of specific hardware, programming language, software class design or environment. It does describe the basic data structures and algorithms used.

Terms

| | |
|---|---|
| Client device | A phone, PDA or other machine running the Cognima client software. |
| Cognima server | A server accessible by client devices which runs the Cognima server software to replicate data. |

-continued

| | |
|---|---|
| Replication | The process of copying data from a client device up to the Cognima Server and then down to other client devices belonging to the same user. |
| User | A human being who owns and uses at least one Cognima client device |
| User data | The set of information (contacts, messages, ringtones, pictures etc) that a user might want to store and manipulate on a client device. |

4.2 Purpose

The objectives of the Cognima software are:

To allow a user instant access to view and modify an 'up to date' copy of their data on multiple handheld devices capable of wireless data connectivity.

To allow a user to view and modify the same data using a conventional web browser.

To effortlessly provide secure backup of a user's data.

To give a user powerful data functionality on a cheap handset by displacing complicated and expensive processing to a server.

4.3 Highest Level Description

Client devices hold a copy of the user's data in a database on the client device. The user can access this data whether or not he has a network connection and therefore always has instant access. When a user changes the data on his device, the changes are copied to a Change-Log. The client device connects periodically to a Cognima Server on the wireless network, to send up the changes from the Change-Log and receive new data. This separates the act of changing data from the need to connect to the network (i.e. push is not continuous in a preferred implementation). The Cognima Server updates its own database with data changes received from the client device, and populates Change-Logs for any other devices the user owns. When these devices next connect, they will receive the changes and thus the devices are kept in sync, each with a copy of the same data.

The Cognima Server contains a web server which allows the user to examine directly using a web browser the copy of the data held in the Cognima Server database, and make changes to it as he would on a client device. The Cognima Server also acts as a gateway for the user to communicate with other servers on the network/internet. For example, the client device can effectively ask the Cognima Server to send a message as an SMS or an email or a fax by setting a few flags in a message object and the Cognima Server contains the functionality to communicate with email servers, SMS servers and fax machines. This can be extended to servers holding ringtones, banking details, games etc. It is easier and cheaper to build the software on the Cognima Server to talk to these other servers, than it would be to build the software on the client device.

5. Lower Level Concepts 5.1 Data Structures 5.1.1 Ids

Cognima user data is described using the terminology of object databases: classes and objects. Unfortunately, there is room for confusion with similarly named OO programming concepts and care therefore needs to be taken.

All users in a Cognima network are assigned a user id. This id is unique to the network—i.e. provided by a given network operator. All users have a Cognima address which is a combination of their user id and Cognima Server URL. This is unique in the world. Each device which belongs to a user is assigned a device id. The device id is unique to the user. This is only 8 bits so a user can have a maximum of 253 devices (id 254 is reserved for the web, id 255 is spare, id 0 is invalid). All user data is classified into classes (contacts class, messages class, bank transactions class etc) and the classes are assigned a class id which is unique in the world. Class id '12' refers to a contact, for example.

An instance of a class is an object, which is assigned an object id unique to the user, e.g. a contacts class object might be the contact for "John Smith". The object id is generated by concatenating the device id of the device which created the object with a monotonic increasing count which increases over the life of the device. So each device can create a maximum of 16777215 objects (if we encountered this limit we could reset the device id). Classes are defined by the properties which constitute them. A class is essentially an array of properties. Each property in the class has a property id which is unique to the class (and is actually just the array position of the property in the property array, starting from zero).

5.1.2 Creating Objects

An object is created on a device. It is assigned an object id and saved to the device database. A copy is also saved into a Change-Log. When the device next connects to the Cognima Server the entry in the Change-Log is sent up. The Cognima Server saves the object to its database (recording the system time), does any class specific processing that may be required (such as generating and sending an email) and adds entries to Change-Logs for any other devices that the user may own which have declared interest in the class. (The entries should be for the correct version of the class on the device).

An object may also be created on the web portal. The object id is generated (using device id of 254 as described above) and processed identically to the device. There is no Change-Log for the web portal, it gets selections directly from the Cognima Server database.

An object may also be created by a server application (e.g. a messaging module might receive an email from which it creates a message object). The object id is generated (using device id of 254 as described above) and processed identically to the device.

5.1.3 Updating Objects

One or more properties of an existing object are modified on a device. The changes are saved to the device database. Each changed property is used to generate an entry in the device Change-Log. These are sent up to the Cognima Server.

If the time of the update is later than the 'last changed' time for the property in the Cognima Server database then the Cognima Server saves the changes to its database (recording the new 'last changed' time for the property), does any required class specific processing and adds entries to Change-Logs for other devices which belong to the user, have declared the class and have a version of the class which contains the property. The update is also placed on the Change-Log for the device that originated the change. This may seem strange but is required to cope with the following scenario:

A user has 2 devices A and B. He updates property 7 on A offline at 5 pm and updates it on B offline at 6 pm. He connects to the network with A first. The valve of 7 on A gets put in the Change-Log to be sent to B. Later B connects. Its value of 7 is more recent so the value of 7 on B is sent to A, but B gets A's value. Replicating the value of 7 back to B fixes this.

If an update is received by the Cognima Server for an object which is marked as deleted and the update is later than the deletion, then this is interpreted as an un-deletion. The object is undeleted, updated and then a refresh of the object in placed on the Change-Logs for all appropriate devices. Updates from the web portal or server applications work in the same way.

5.1.4 Deleting Objects

An object is deleted on the device. It is removed from the device database and an entry is put on the Change-Log listing the class id and object id. The entry is sent up to the Cognima Server.

If the time of the deletion is later than the last updated time of the object, then the Cognima Server marks the object as deleted in its database, does any class specific processing and adds the entry to other devices that belong to the user and have declared the class.

If the time of deletion is earlier than the last updated time then this indicates that the deletion is invalid and a refresh of the object is put on the Change-Log for the device which originated the deletion.

The deleted object is viewable in the web portal a manner that makes its deleted status clear. The user can select the object for un-deletion. The deletion mark is removed from the object in the Cognima Server database and entries to refresh the object are placed on the Change-Logs for all devices that belong to the user and have declared the class.

5.1.5 Property Types

Each property has a type. There are currently 9 permitted property types:

| Type name | Type value | Type description |
| --- | --- | --- |
| KcogTypeRef | 0 | 4 byte object id of another object |
| KcogTypeInt | 1 | signed 4 byte integer value |
| KcogTypeUInt | 2 | unsigned 4 byte integer value |
| KcogTypeFloat | 3 | signed 4 byte floating value |
| KcogTypeStr | 4 | a CogString (a 4 byte unsigned integer holding the number of characters in the string, followed by the character bytes) |
| KcogTypeTime | 5 | unsigned 4 byte integer value indicating the number of seconds since midnight Jan. 1, 1990 |
| KcogTypeTypedStr | 6 | unsigned 4 byte integer value followed by a CogString |
| KcogTypeBlob | 7 | a stream of bytes preceded by a 4 byte unsigned integer which holds the number of bytes |
| KcogTypeArray | 8 | a blob structure which can hold an array of any kind of data |

A CogString is a character count followed by the characters. If the string is ASCII then the space taken up by the string will be (4+char count) bytes. If the string is Unicode then the space taken up will be (4+(char count*2)) bytes.

A CogTypedString is a CogString preceded by a type (4 byte unsigned integer). The only use of a typed string so far is a Contact Point. The type identifies the type of contact point (e.g. email address, home phone) and the string holds the address (e.g. bob@xxx.yyy, 01233556677).

A CogBlob is a length in bytes followed by that number of bytes. It can be used to store any binary data A CogArray is passed around as a 4 byte unsigned integer 'type' followed by two blobs. The 'type' indicates the type of elements held in the array. The first blob is an index blob: it holds a sequence of offsets (4 byte unsigned integers) into the second blob. The second blob is the data blob which holds the elements of the array as a sequence of binary lumps. Elements can be extracted from the data blob by counting along the index blob to get the offset of the start of the element in the data blob. This is the stream structure of the CogArray as it is passed around. Inside a particular system it may appear as a conventional vector (i.e. already parsed).

The only implemented example of a CogArray is the MessageAddress. Each element of the MessageAddress is an AddressPair. An AddressPair is a contact id (object id of a contact object) followed by a Contact Point.

5.1.6 Smart Property Parameters

Some of the properties can be made "smart". This means they can be parameterised for a specific device to sculpt the data in the property for the characteristics of the device. In practice the parameters are two 4 byte unsigned integers, one is a smart type and the other is a max size. For example, the property which holds the body text of a message might be parameterised to smart type kCogPlainText and max size 100 on a cheap phone with limited memory, but parameterised to be smart type kCogRichText and max size 1000 on a PDA with more memory.

The parameters are stored by the Cognima Server when the application is added to the device. When new objects or updates for that class are placed in the Cognima Server Change-Log for that device they are processed according to the smart parameters. This might involve, for example, truncating text, converting Unicode text to narrow text or converting image formats.

It is important for data integrity that the object held in the Cognima Server database be a copy of the object as it was generated. Even if you see a cut down version on a device you can effectively manipulate the complete version on the Cognima Server.

5.1.7 Class Versions

We have the concept of a class version which is defined by a 4 byte unsigned integer. A new class version may add properties to the end of the old class, but it may not change or remove existing properties, or insert new properties between existing properties. This should allow interoperability between versions. Class definitions with different smart property parameters are not different versions.

5.2 Passing User Data Around

Cognima utilises the idea of class metadata to minimise the data that needs to be copied around between databases. Class metadata is essentially an array of property metadata. Property metadata is a property id, a property type, a smart type and a max size.

User data is transferred as a stream with no formatting information other than a class id. This stream is parsed by looking up the class metadata. So if a stream is received for class 6 and the class metadata for class 6 says that property 0 is a KcogTypeUInt and property 1 is a kcogTypeStr, then you know that the first 4 bytes of the stream should be interpreted as an unsigned integer, the next 4 bytes should be interpreted as an unsigned integer holding the number of characters n in the succeeding string, the next n (times 2 if Unicode) bytes hold the characters in the string etc.

Client devices declare to the Cognima Server the classes that they support. This enables the device to subsequently send up only raw user data (with a header containing class id, object id and a few other things) and hence minimises bandwidth requirements. This can be contrasted with, for example, XML reliant systems that are far more bandwidth hungry.

The client device class declarations also contain the smart property parameters so that the Cognima Server can sculpt the data for the device. It is worth emphasising that the meaning of a property is hard coded into an application. The class metadata states that property 2 in class 7 is a string with max length 30 characters. It is the code in the application that interprets property 2 in class 7 as the name of a football team.

5.2.1 Data Replication Issues in More Depth

Data is held in Objects that are created on client devices and the server these devices connect to (known as the Cognima Server). These objects and any changes made to them are replicated between the client devices and the Cognima Server.

The design of the replication process allows:

A set of objects to be defined that will be replicated so that the same set of objects will be held on a Cognima Server and all the client devices that are logged on to that server for a given user. New objects created on any device or the server will be replicated to all other devices. Changes in any property of an object will be replicated to all devices.

Only the minimum data to be transmitted across the network for a given update since only changes in data are sent from clients to the Cognima Server or vice versa.

A key part of the design was to not require times of modification to be kept for each property of an object on the client device as updating these on constrained client devices is slow and keeping a last modified time for each property in an object would take a lot of space.

On the Cognima Server storing modification times for all properties of an object is fine as the server has enough storage space and processing power to deal with this.

5.2.2 Metadata

In order for the system to work it needs a clear idea of what properties are defined for a given class of objects. This is done by providing the programmer with a few C++ compiler macros that allow definition of the class metadata.

The definition of the properties to be used in a class result in a Class Metadata definition. This definition tells the CRE (Cognima recognition engine) what type a given property is and allows it to pack and unpack an object or a property for transmission over a data link. In order for the CRE system to work all clients and the server must have the same class metadata definition. Thus the following occurs:

When a new Metadata definition is declared on a client device it is sent to the Cognima Server and from there the Cognima Server will send it to all other clients.

When a new Metadata definition is declared on a Cognima Server the definition is sent to all client devices.

When a new client device logs on to a Cognima Server for the first time all of the metadata definitions are sent to that device before any objects are sent.

In all of the above cases a future optimisation may be made so that the Cognima Server only sends the metadata definition to clients who access the class (and the specific properties) the metadata refers to.

5.2.3 ChangeLog

The purpose of the ChangeLog is to record any changes that have occurred since the client device last connected to the Cognima Server (or the Cognima Server to the client device). Using Cognima APIs, applications connect to the CRE and can cause objects to be created or deleted, or a property in an object to be changed. These changes are added to a Change-Log on the local device as they are made together with the time the change was made. Objects are given unique identifiers when they are created so that a given object can always be identified.

In the same way, creation and deletion of objects and changes to object properties by applications running on the Cognima Server result in the changes being added to all the Change-Logs of all the client devices registered to that user on the Cognima Server. The time of changes are recorded for each object or property.

ChangeLogs can be built in two ways:

As the new objects are created and properties are changed (this is normally the case for client devices)

Or they can be built on demand when they are needed by using the last modified times of objects and properties if these are stored on the system (in some circumstances, this method may be used on the Cognima Server instead of the above method).

5.2.4 Replication

When a client device has items in its ChangeLog to send it will connect to the Cognima Server (and likewise for the Cognima Server connecting to the client device). By default, the items in the ChangeLog are sent in the order in which they were added to the ChangeLog, however they may be re-prioritised immediately before sending to provide for premium services, urgent data and so on. Items transferred are:

A metadata definition including the type of each property of a given class of objects.

A new object that has been created—with the contents of the properties of that object.

A property has been changed—with the new value of the property.

An object has been deleted.

In all the above cases the appropriate IDs are sent to identify the object, class and properties involved. All ChangeLog items are marked with the time the item was added to the ChangeLog. These times are always local machine times and are resolved into GMT by the Time Management approach described in Section 6.2.

When a client device receives ChangeLog items from a Cognima Server:

When a client device receives a new object message from a Cognima Server it adds this new object to its local database.

When a client device receives an object deletion message from a Cognima Server it marks the object as deleted in its local database.

When a client device receives a property change it is always assumed that the Cognima Server is authoritative on the current state of the database and so the change is always made to the value of the property held in the local database.

A Cognima Server receives ChangeLog items from a client device:

When a Cognima Server receives a new object from a client device it is added to the Cognima Server database and also added to all the Change-Logs of the client devices registered to that user, apart from the Change-Log of the machine that sent the new object in the first place.

When a Cognima Server receives an object deletion from a client device the object is marked for deletion and an object deletion message is added to all the Change-Logs of the devices registered to that user apart from the Change-Log of the machine that sent the object deletion in the first place.

When a Cognima Server receives a property change it compares the time of the change to the current time held for that property on the Cognima Server. If the time of the property change is later than that held on the Cognima Server the property value is changed in the server database and this change is also added all the Change-Logs of the client devices registered to that user—including the one of the machine that sent in property change (in case another object update has been sent to that machine in the meantime). If the property change was not later than the one held on the Cognima Server no change is made as the stored property value is more recent—but the value is added to the list of old property values on the Cognima Server so that a user can retrieve it later if required. When times are compared the Time Management approach described in Section 6.2.below is used.

When a device first connects to a Cognima Server it will be sent all class metadata definitions and then all the objects in the database for that user. The Deletion messages generally just mark an Object for deletion. Actual removal of the object from the database may occur later on once all objects referring to that object have also been deleted.

5.2.5 Optimisations

An optimised version of the above replication protocol allows for aggregation of the entries in the ChangeLog. If a ChangeLog (in the Cognima Server or on a client device) has not yet been replicated, and a subsequent entry is added, then existing entries can be scanned to potentially reduce the number of entries that need to be replicated during the next connection:

- if the new entry is an update to a property that is already scheduled for update then only the later entry need be retained
- if the new entry is an object deletion then all property updates for that object can be removed from the ChangeLog
- if the new entry is an 'undelete' command and the original deletion is still in the ChangeLog then the two entries can both be removed from the ChangeLog

6. Core Algorithms

6.1 Handling Endian-ness

Operating systems are fundamentally little endian or big endian which is a choice of the byte order in which numbers and strings are stored. If two computers which have different endian-ness have to communicate then one of the computers will have to switch the endian-ness of its data packets. In the Cognima environment the Cognima client software uses the same endian-ness as the host client device. The Cognima Server has to determine the endian-ness of the client device (it uses a reference value in the first packet of data from the client) and then convert the subsequent incoming data if necessary to maintain consistent endian-ness in the Cognima Server. The Cognima Server also has to convert any outgoing data it sends back to the client device.

6.2 Synchronising System Times

Different devices will inevitably have slightly different system times. Changes that are sent from client devices to the Cognima Server are stamped with the device system time at the time of the change. It is up to the Cognima Server to resolve the times on different devices so that it can judge the order in which changes took place and record the correct update.

The logon of a device contains the current device time. The Cognima Server should be able to compensate for the latency of the network and compare the login time with its own system time. This will give it a delta between the device time and the Cognima Server time. This delta can be applied to further times sent up by the device in that session.

The Cognima Server can compare deltas in successive sessions from a device to determine clock 'creep' on the device or changes of time zone: it cannot be assumed that all the client devices in the system have clocks that are well synchronised to each other:

- Clock times drift on devices depending on the device's clock accuracy.
- Some users like to set clocks 5 minutes early for example.
- Some users will make changes to clocks to account for daylight saving rather than adjusting the locale settings (and some OSes may not provide locale features anyway forcing the user to change the clock directly).

To get round this problem, the server will be responsible for adjusting times used by the client device to GMT when comparisons are made on the Server, and from GMT to the equivalent time for the client device when messages are sent from the Cognima Server to the client device.

The client device will tag all the items in the ChangeLog with times obtained from the local clock—as far as the client device is concerned it only ever deals in time based on the client device's own clock.

Each time the client device connects to the Cognima Server it sends its view of the current time as given by the clock on the client device. From this the Server can work out:

- What the delta to GM is
- If there has been any drift in the mobile device clock since the last time it logged on since the server keeps a record of the last delta to GMT and when the last connection was made and therefore can compare these. If there is drift the server can adjust all times sent by the mobile device pro-rata.

For example the table below shows a pattern of events with a client device connecting to a Cognima Server. The Client device's time is 5 minutes slower that the Cognima Server and is loosing a minute every hour (an extreme case to show the point). Also to show the point we will assume that from 09:00 to 12:00 the user is on a plane and out of contact with the Cognima Server so it does not connect during this time:

| Action | Client Device Time | Cognima Server time (GMT) |
|---|---|---|
| Client device connects to Cognima Server | 09:00 | 09:05 |
| A change is made to property A | 10:00 | X |
| A change is made to property B | 11:00 | Y |
| Client device connects to Cognima Server | 12:00 | 12:08 |

In order to work out if the property changes were made before or after the time stored on the Cognima Server the times X and Y need to be worked out. From the information above the Cognima Server knows that when the client last connected it was around 3 hours ago and at that point the time difference was 5 minutes whereas now it is 8 minutes. Thus, assuming the clock drift happens linearly, the Cognima Server can work out that the device is 5 minutes behind GMT and that the clock is drifting back a minute every hour.

From this is it possible to work out that the time the client device knows as 10:00 for the property A change needs to have 5 minutes added to it for the initial drift, plus one minute for the extra drift that occurred in the hour till that property was changed.

Likewise Property B needs to be adjusted to 11:07—the 5 minutes initial drift plus 2 minutes since two hours elapsed from 09:00 to 11:00 when the property was changed.

In practice the delta to the time between the client device time and GMT may be minutes, but the drift will be in the order of fractions of seconds per hour.

6.2.1 Time Adjustments

As well as the delta to GMT and any drift in the client device clock, users can also change the time on the client device. They may do this to reset the time to the correct local time (we can give the user the option to have this happen automatically but some users may want to keep their own control of their client device time—e.g. they like to have the clock set 5 minutes fast). They may also make adjustments to reflect a change of local time (i.e. daylight savings or changing timezone). The goal is that the user can change the clock on the device to any time that suits the user and the device simply takes account of this.

When the user makes a change to the client device time most operating systems will report this change (for systems that don't do this the time can be polled say every minute to check for such a change). On detecting a change in time the client device will work out the delta between the new time and the time as it was before the change. For example this may be a change of plus one hour as a user moves timezone. The client device stores this time difference as the Adjust Time which it saves for the next connection to the Cognima Server. The client device also goes through every entry in the ChangeLog and updates all times in the log by Adjust Time. This ensures that the entries in the ChangeLog are always relative to the local time on the client device.

Several such adjustments could be made between connections to the Cognima Server—each time the amount of the time change is summed with the Adjust Time and the ChangeLog updated so that the times in the log are all relative to the local time on the client device.

When the client device next connects to the Cognima Server the client device sends at logon the stored Adjust Time—i.e. the amount by which the client device clock has been adjusted backwards or forwards since the last connection. The Cognima Server can then remove this amount from the time from the delta to GMT and drift calculation.

6.2.2 GMT to Client Device

The same set of calculations can be made in reverse to convert the GMT times of changes made on the Cognima Server to the correct local time for a given client device.

6.3 Adding an Application

An application will use one or more classes to hold user data. The definition of the class is hard coded into the application. The version of the class is co-ordinated by releases of the application.

Say that a statistics application uses a Footballer class to hold data about footballers. When the application starts on a client device for the first time, it inquires from the device what version of the Footballer class the device already holds. If the version on the device is the same as the version that the application has been hard coded to use then nothing more need be done.

If the device holds a newer version of the Footballer class, then the application needs to be robust enough to cope with more properties than it expected. (MTis situation would arise if you had a class being used by multiple apps and for some reason you installed an older version of one of the apps. This should be rare: ideally interdependent apps should be upgraded together.)

If the device holds an older version of the Footballer class (or no version at all) then the application's version of the Footballer class should replace it. The new version is sent up to the Cognima Server. The Cognima Server therefore maintains a list of versions of classes used on all devices.

The web portal pages will be the equivalent of the hard-coded device application. The web can extract objects from the database according to the latest version of the class, and if there are more properties than it was hard coded to expect it can ignore them. Therefore the web does not need to declare class versions.

6.4 Change-Log Optimisation

The Cognima Server maintains Change-Logs for all devices listing changes that will be sent to the devices when the devices next connect. There will be optimisations that can be made to the Change-Logs, for example:

If >2 updates to the same property are queued in the Change-Log then only the last need be kept.

If a deletion is queued for an object then any updates ahead in the queue may be removed.

If an update is queued for an object then any delete ahead in the queue should be removed.

If a device registers a new application there could potentially be very many objects to send down to it (e.g. message history). The Change-Log should only have a sensible number of objects added to it (e.g. the 20 most recent messages).

7. Ghosting, Resurrection, Pinning and Withdrawal

The space available on a client device to hold user data will typically be orders of magnitude less than the space available on the server. The device needs to hold a subset of data and the user should have to do as little work as possible to maintain this subset. Ghosting and withdrawal are tools to aid this.

A class definition may include flagging certain properties as 'ghostable'. This means that if the object is ghosted those properties will be nulled, freeing room on the client device. Ghosting is done automatically on the device. The decision about which objects to ghost is made by following a 'ghosting rule' and applying the rule whenever an object is created or updated. The rule defines the maximum number of a selection of objects. When the maximum is exceeded the objects in the selection at the bottom of a sort order are ghosted.

For example, the class might be messages, the selection might be messages in the inbox, the sort order might be by date/time and the maximum number might be 50. If there are 50 messages in the inbox and a new message arrives, the oldest message in the inbox is ghosted. Ghosting may remove the message body but leave enough header information for the message to be recognised.

Withdrawal (also known in the past as auto-deletion and removal) is similar to ghosting but works by removing the entire object, not just part of it.

Neither ghosting nor withdrawal are notified to the Cognima Server. They are purely local to the client device. Therefore different devices may have different numbers of objects. The data on the devices is still fundamentally in sync, but the devices hold different data subsets.

If the user wants to resurrect a ghost then a request is passed from the client to the Cognima Server for the object to be resurrected. A refresh of the object is sent down to the device and the object is put back to normal.

Individual objects can be pinned. A pinned object is never ghosted or removed. Pinning can be chosen by the user, or it can happen automatically. For example, an object that is resurrected is automatically pinned.

8. User Replication—Sharing Objects

There are many applications for which we envisage it will be useful for users to be able to share objects. The general way that this will work is: A user needs to know the Cognima address of users that he may want to share objects with. It is more appropriate to discuss the retrieval of these addresses in detail in the Cognima Server architecture. Here we assume that such a list is available.

A set of one or more Cognima addresses is attached to the object which is to be shared. The object can be set to read-only (so the people you share it with cannot modify it). When the Cognima Server receives the new object (or receives an update to it) from the web or a client device it replicates it as normal.

It also looks up the list of 'sharees' Cognima addresses. It marks the object with an originator id (i.e. the Cognima address of the object owner+the object id) and sends it to the sharees. The sharee users may exist on the same Cognima Server or be on different Cognima Servers. The Cognima Server of the sharee receives the object. If it is a new object it assigns a new object id (keeping note of the originator id). If it is an update it finds the object using the originator id. If the sharee is allowed to update the object, the update can be replicated back to the object owner using the originator id.

9. Displaying Data

Conventional small devices like PDA tend to have simple filing systems that allow applications to read and write data to some kind of storage that will keep the data when the application is not running. Generally these programs will tend to read in the available set of data and then provide a user interface to display the data on the screen. This has some disadvantages:

Reading in the data when the program starts takes time

The application needs to store all or some of the data in memory meaning it is now occupying more memory on the client device Allowing more than one application to access the same set of data becomes non-trivial Similar code to read and manipulate the data appears in several applications that run on the device.

The Cognima approach is different:

Data is stored in an Object Database that can be accessed by several applications A Cognima application does not read in all the data it deals with from a database. Instead it creates a selection—a subset of the data which it is currently interested in. In general this selection matches the data that is currently being displayed on the devices screen. Thus only the data currently being used by the application is held in memory—saving a lot of memory space.

All of the work of storing, sorting and indexing the data is done by the Object Database and so this functionality does not need to be repeated in each application.

When changes need to be made to data in an application, the application never directly updates its own display of the data. Changes will update the properties in an object or create or delete an object. A change to the data could be made by another application or an update received from a Cognima Server due to the data being changed on another machine.

When an application sets up a selection it gives a list of criteria by which data is either included or excluded from the selection—because of this the Cognima Replication Engine can tell which applications to notify when an object is created, deleted or updated.

When an update needs to be sent to the application, code in the application linked to the selection that contains this data is called and in this way the application can respond to the changes that have been made.

When selections are set up, the application can also specify how the data is sorted and if only a small window on the sorted list of data is required (known as a view).

This approach is similar to the screen re-paint approach used to redraw graphics screens on Windowing systems. When an area of the screen needs repainting the application that is responsible for that bit of screen is called to repaint the screen.

9.1 Example

A client device may have a contacts application running on it—this device replicates data with a Cognima Server connected to other client devices also running contacts applications. A class of object is defined for a Contact that contains names and phone numbers and these are replicated to all the devices of a given user.

An application on one device may have a display that shows all contacts by beginning letter—for example the interface allows the user to press a D button to show all the names beginning with D. This application will set up a selection that contains objects:

Where the class is defined as Contacts

Where the name begins with the selected letter (e.g. D)

When the selection is defined the application also defines code to be called by the CRE when objects are added, deleted or updated.

When the selection is first set up this code will be called back with the first set of objects that fulfill the above criteria.

If the application was asked to create a new contact with a name beginning with D the application would create the object but do nothing else. The CRE would detect the new object and call back the selection code to notify it of the new object.

Likewise is a new Contact object was created on another device and was replicated to the client device—if the name of that Contact began with D the application would be notified.

9.2 Sorting

Data in selections generally needs to be sorted—often so that when displayed users can see data in a logical format. When a selection is defined the sorting order can be specified: the properties to sort on, in what order and what sorting algorithms to use.

9.3 Views

There may be many items of data in a selection. Commonly when the data is being displayed it may not all fit on the screen and so the user will need to scroll up and down the data. A view provides this functionality by specifying the number of items of data the selection wants to deal with and the number of the first item of data out of the complete list of data the application wants to appear in the selection.

Views are important because they allow an application to limit the amount of data it stores locally to be limited to just the amount needed to display on the screen this reducing unnecessary duplication of data.

9.4 Efficiency

Cognima has made some efficiency optimisations in how the data is transferred between the Cognima server and client application—when multiple data changes are made the data is sent in blocks and then the application informed that the changes are complete so that the application only needs to update its user interface once.

9.5 Example

As an example we will define a selection called ContactSelection. This is the code that the framework will call back whenever a change is made to any of the selected objects. In the Cognima framework this is implemented as an object which you derive from the COdbSelect templated class—specifiying the type of object you want to have in the selection as the template argument. class CContactSelect: public COdbSelect<CContact>

```
{
public:
    CContactSelect(COdb *aOdb);
    void ObjectAdded(CContact *aObject);
    void ObjectUpdated(CContact *aObject);
    void ObjectRemoved(const TOdbObjectId aObjectId);
private:
    bool ListContacts( );
};
```

The methods ObjectAdded( ), ObjectUpdated( ) and ObjectRemoved( ) are called by the framework whenever respectively an object is added, updated or removed. When you implement the Selection class you don't need to implement all these methods if you do not want to take instance action on any of these events—in some cases you may set up a selection to keep a list of a certain set of objects but only check that list on some other event and so the above methods would not be required.

We have defined one extra private method called ListContacts( )—this will list all the current contacts held by the selection.

Here is the implementation of this class:

CContactSelect::CContactSelect(COdb *aOdb)
: COdbSelect<CContact>(aOdb)
{
}
    void                CContactSelect::ObjectAdded
(CTestContact*aContact)

```
{
    OdbLog(OdbLogApp,L"New contact added: " << aContact->GetName( ));
    ListContacts( );
}
``` void                CContactSelect::ObjectUpdated
(CTestContact*aContact)

```
{
    OdbLog(OdbLogApp,L"Contact updated: " << aContact->GetName( ));
    ListContacts( );
}
``` void CContactSelect::ObjectRemoved(const TOdbObjectId aObjectId)

```
{
    OdbLog(OdbLogApp,L"Contact deleted - Id: " << aObjectId);
    ListContacts( );
}
``` void CContactSelect::ListContacts( )

```
{
    OdbLog(OdbLogApp,L"Contacts list:");
    for (unsigned long Index=0; Index<iResult.size( ); Index++)
    {
        CTestContact*Contact=iResult[Index];
        OdbLog(OdbLogApp,Contact->GetName( ) << ", "
            << Contact->GetPhone( ) << ", "
            << Contact->GetEmail( ));
    }
}
```

The constructor simply calls the default COdbSelect constructor. The ObjectAdded( ), Updated( ) and Removed( ) methods print out what change was made and then call ListContacts( ) to show what the current contents of the list is.

The ListContacts( ) shows how the current list of object held by the selection can be accessed. The current list of pointers to objects is held in a container class called iResult—this can then be accessed by normal container class integrators. In this case we simply go through the list and print all the objects in the list.

The invention claimed is:

1. A method of replicating data stored on a mobile telephone by copying that data to a first computing device, in which the data is stored on the first computing device and made available to other devices by the first computing device, in which the first computing device determines whether data that is time stamped by a second computing device, which is the mobile telephone, using a clock running on the second device, is to be replicated or not comprising the steps of:
    (a) the first computing device comparing the time stamp from the second computing device against a time signal from its own local clock to determine a delta and using that delta to deduce the correct delta to apply to time stamps associated with later data from the second computing device; and
    (b) the first computing device taking sole responsibility for determining whether or not that later data from the second computing device is to be stored on the first computing device and made available to other devices by the first computing device.

2. The method of claim 1 in which the local clock of the first computing device is set to an absolute, externally derived time.

3. The method of claim 1 in which the delta deduced by the first computing device assumes that the local clock in the second computing device is drifting in a linear manner.

4. The method of claim 1 in which, if a deliberate time adjustment to accommodate a change of time frame is made to the local clock on the second computing device, then the second computing device stores a record of this time adjustment and provides it to the first computing device.

5. The method of claim 4 in which the second computing device alters one or more time stamps stored on it by the amount of the deliberate time adjustment so that the time stamps remain correct in the new time frame.

6. The method of claim 1 in which the first computing device uses its knowledge of the correct deltas relative to its own clock in order to apply correctly a time dependent arbitration rule to determine which of several inconsistent data replication requests it should action.

7. The method of claim 1 in which the time stamp applied by the second computing device is outside of a database record containing the data to be replicated.

8. The method of claim 7 in which the time stamp resides in a change log which includes only the minimum data needed to identify a change to data.

9. The method of claim 1 where the data is contacts data.

10. The method of claim 1 where the data is personal data.

11. The method of claim 1 where the data is presence data.

12. The method of claim 1 where the data is e-mail data.

13. The method of claim 1 where the data is calendar data.

14. The method of claim 1 where the data is picture data.

15. The method of claim 1 where the data is ringtone data.

16. The method of claim 1 where the data is games data.

17. The method of claim 1 where the data is document information.

18. An apparatus, comprising:
a first computing device capable of replicating data stored on a mobile telephone by copying that data to a first computing device, in which the data is stored on the first computing device and made available to other devices by the first computing device and having sole responsibility for determining whether or not data that is time stamped by a second computing device, which is the mobile telephone, using a clock running on the second computing device, is to be stored on the first computing device and made available to other devices by the first computing device;
wherein the first computing device can compare the time stamp from the second computing device against time signals from its own local clock to determine a delta and use that delta to deduce the correct delta to apply to time stamps associated with later data from the second computing device.

19. The apparatus of claim 18, wherein said first computing device comprises a server and the second computing device acts as a client of that server.

* * * * *